United States Patent [19]
Johnson

[11] Patent Number: 5,238,385
[45] Date of Patent: Aug. 24, 1993

[54] EXTRUSION DIE ASSEMBLY

[75] Inventor: Roger D. Johnson, St. Joseph, Mo.

[73] Assignee: Nestec S.A., Vevey, Switzerland

[21] Appl. No.: 886,909

[22] Filed: May 22, 1992

[51] Int. Cl.$^5$ ............................................. B29C 47/30
[52] U.S. Cl. ................................... 425/183; 425/185;
425/382.3; 425/382.4; 425/464; 426/516
[58] Field of Search ............... 425/145, 146, 464, 467,
425/382.3, 382.4, 183, 185, 461, 382 R, 464;
426/516, 517

[56] References Cited

U.S. PATENT DOCUMENTS

| | | | |
|---|---|---|---|
| 3,193,878 | 7/1965 | Corbett | 425/382 R |
| 3,416,190 | 12/1968 | Mehnert | 425/382 R |
| 3,589,163 | 6/1971 | Byrne | 425/185 |
| 3,867,082 | 2/1975 | Lambertus | 425/464 |
| 4,076,477 | 2/1978 | Hacke | 425/464 |
| 4,395,217 | 7/1983 | Benadi | 425/382 R |

FOREIGN PATENT DOCUMENTS 2020946 11/1971 Fed. Rep. of Germany ... 425/382 R

*Primary Examiner*—Khanh P. Nguyen

[57] ABSTRACT

An extrusion die assembly, adapted to be secured to the discharge end of an extruder, for producing extruded products having different sizes and/or shapes from a single extruder without interrupting the operation of the extruder. The die assembly includes a block having an inlet duct to receive thermoplastic material discharged from the extruder, and a pair of discharge ducts which diverge axially from the inlet duct and terminate in a pair of spaced die plates. A cylindrical diversion valve is rotatably mounted in the die assembly at the convergence of the outlet ducts and the inlet duct, with the valve having an angled passage extending therethrough for directing the flow of thermoplastic material from the inlet duct into one of the outlet ducts. The diversion valve enables thermoplastic material to be diverted from one die plate to the other without interrupting the operation of the extruder.

9 Claims, 2 Drawing Sheets

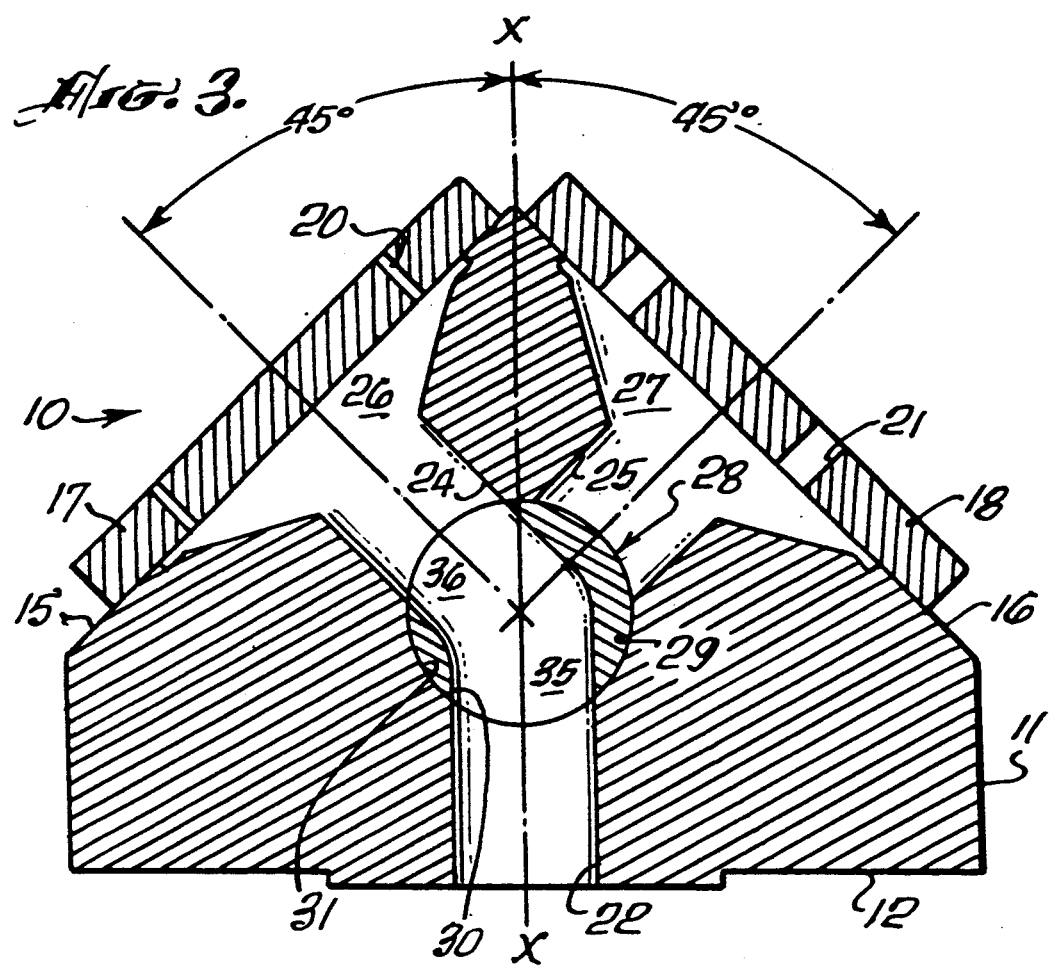
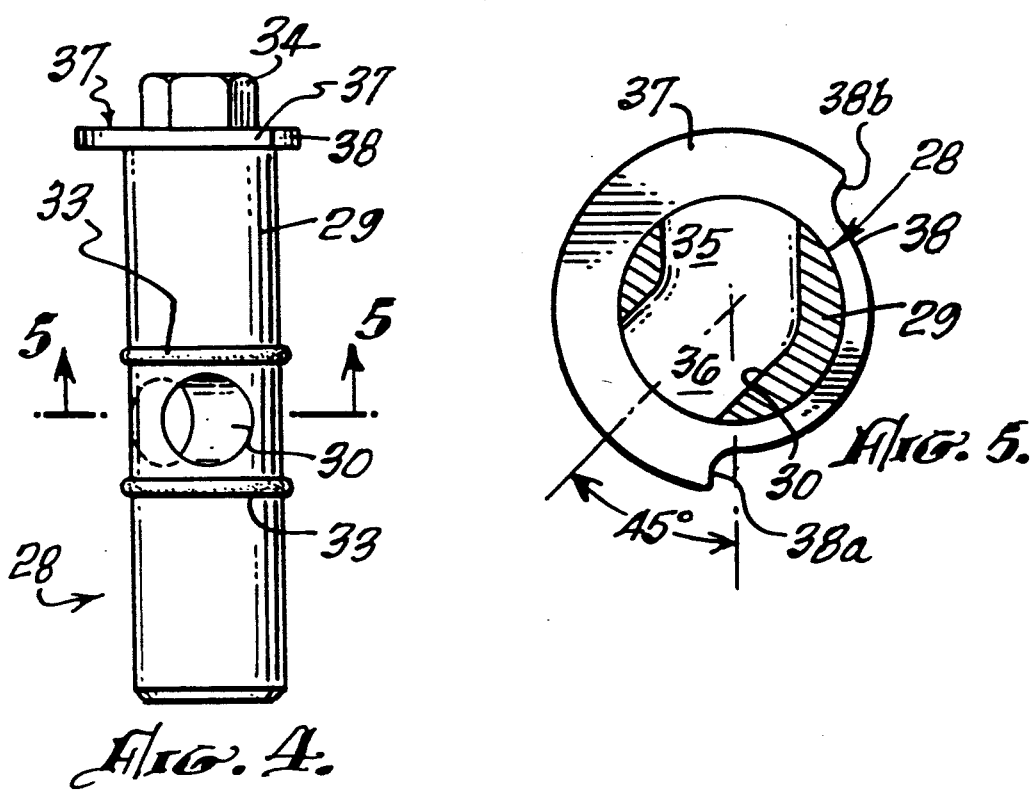

001E
EXTRUSION DIE ASSEMBLY

BACKGROUND OF THE INVENTION

This invention relates of a multi-faced extrusion die assembly for an extruder, which facilitates production of extruded pieces having more than one cross-sectional configuration. More particularly, the invention relates to an extrusion die assembly adapted to be mounted on an extruder, with the assembly having a plurality of spaced die plates and including a rotatable diversion valve for directing the flow of thermoplastic material from the extruder to a selected die plate without interrupting the operation of the extruder.

Extruders are widely used in a number of industries, particularly the food industry in which extruders are utilized to produce a variety of products such as snack foods, breakfast cereals, pet foods, and confections. Extruders typically consist of one or more sets of flighted screws which rotate within a barrel and have a die plate mounted across the discharge end of the extruder barrel. Thermoplastic material from the extruder is forced through one or more die openings in the die plate, with the openings having a particular cross-sectional configuration whereby the extrudate has the same single cross-sectional configuration as the die openings. The thermoplastic material extruded through the die openings is cut into pieces of desired length, typically by means of a rotary knife mounted adjacent the outer face of the die plate.

The use of die plates having die openings of more than one cross-sectional configuration is not feasible for it would provide non-uniform flow rates and different flow resistances across the extrusion orifices, resulting in the production of undesirable non-uniform extruded pieces. Thus, the production of extruded pieces having different shapes or sizes requires the use of separate die plates, each having die orifices of one desired cross-sectional configuration. In commercial production operations, when it is desired to change the size or shape of pieces produced from an extruder, the operation of the extruder must be stopped while one die plate is removed and is replaced by another die plate having orifices of the desired size or shape.

Such interruptions in the operation of the extruder have an adverse effect on the production capacity of the extruder and result in the loss of significant amounts of material.

SUMMARY OF THE INVENTION

The present invention provides an extrusion die assembly adapted to be mounted on an extruder, the die assembly having a plurality of spaced die plates and a rotatable diversion valve for directing the flow of thermoplastic material from an extruder to a preselected one of the die plates. The rotatable diversion valve enables the flow of thermoplastic material to be diverted from one die plate to another without interrupting the operation of the extruder and with little loss of material. The extrusion die assembly of this invention enable extruded product of different sizes and/or shapes to be produced from a single extruder without interfering with the operation of the extruder. Similarly, die plates and/or knife blades may be changed without stopping the extruder merely by rotating the valve and diverting the flow of thermoplastic material to another die plate. Thus, the die assembly allows continuous operation of the extruder during changes of die plates and/or knife blades.

The die assembly of this invention comprises a block having a back face adapted to be secured to the discharge end of an extruder; a pair of spaced die faces remote from said back face, with a die plate having one or more die orifices being mounted on both of the die faces; an inlet duct in the back face of the block to receive thermoplastic material discharged from the extruder; a pair of discharge ducts which are in communication with and diverge axially from the inlet duct, terminating at the die faces of the block; and a cylindrical diversion valve rotatably mounted in the block at the convergence of the inlet duct and the discharge ducts for directing the flow of thermoplastic material from the inlet duct into one of the two discharge ducts. The cylindrical valve is provided with an angled passage extending therethrough intermediate the ends of the valve, with the angled passage having an inlet leg and an outlet leg offset from one another by an angle equivalent to that which the discharge ducts diverge from the inlet duct. A stop plate is provided on the cylindrical valve to control the positioning of the angled conduit so that one leg of the conduit is in communication with the inlet duct while the opposing leg of the conduit is in communication with one of the discharge ducts to direct the flow of thermoplastic material to one of the die plates. Upon rotation of the valve the position of the conduit legs is reversed to direct the flow of material to the other discharge duct and die plate.

BRIEF DESCRIPTION OF THE DRAWINGS

FIG. 3 is a cross-sectional view of the extrusion die assembly taken along line 3—3 of FIG. 1, but with the die plates in place;

FIG. 4 is a side view of the rotary valve of the present invention;

FIG. 5 is a cross-sectional view of the rotary valve taken along line 5—5 of FIG. 4.

DETAILED DESCRIPTION OF THE INVENTION

Figure 1:
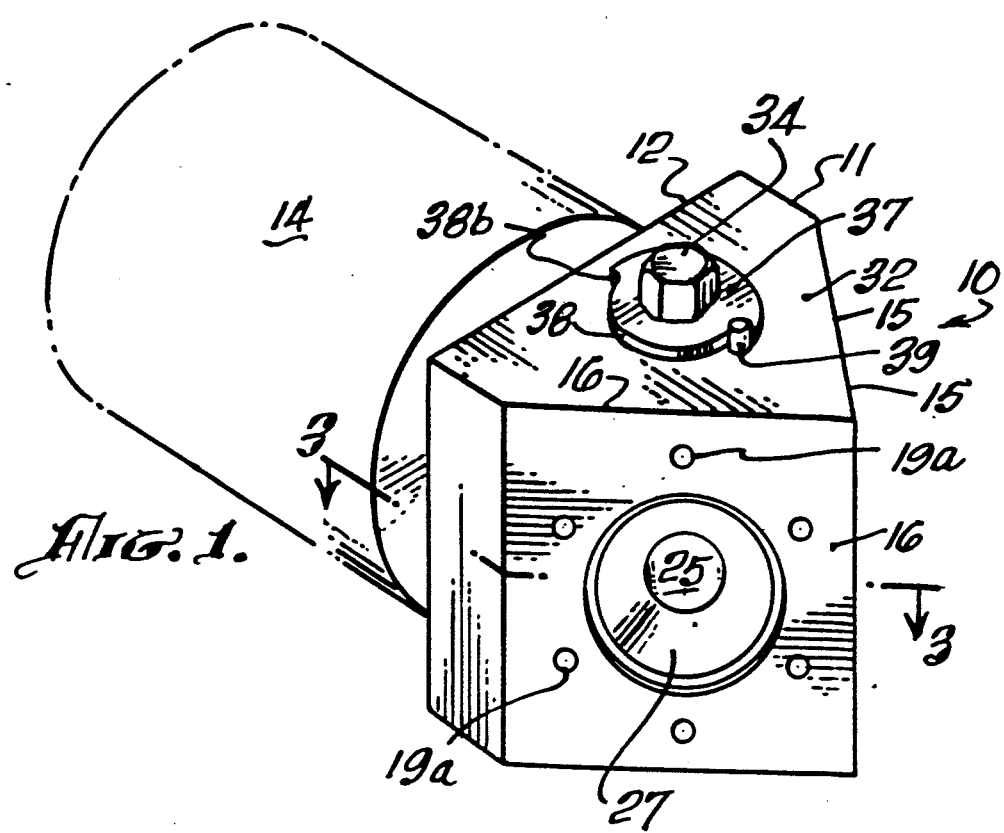
FIG. 1 is a perspective view of an embodiment of the extrusion die assembly of this invention secured to an extruder, before die plates are secured to the assembly.
Figure 2:
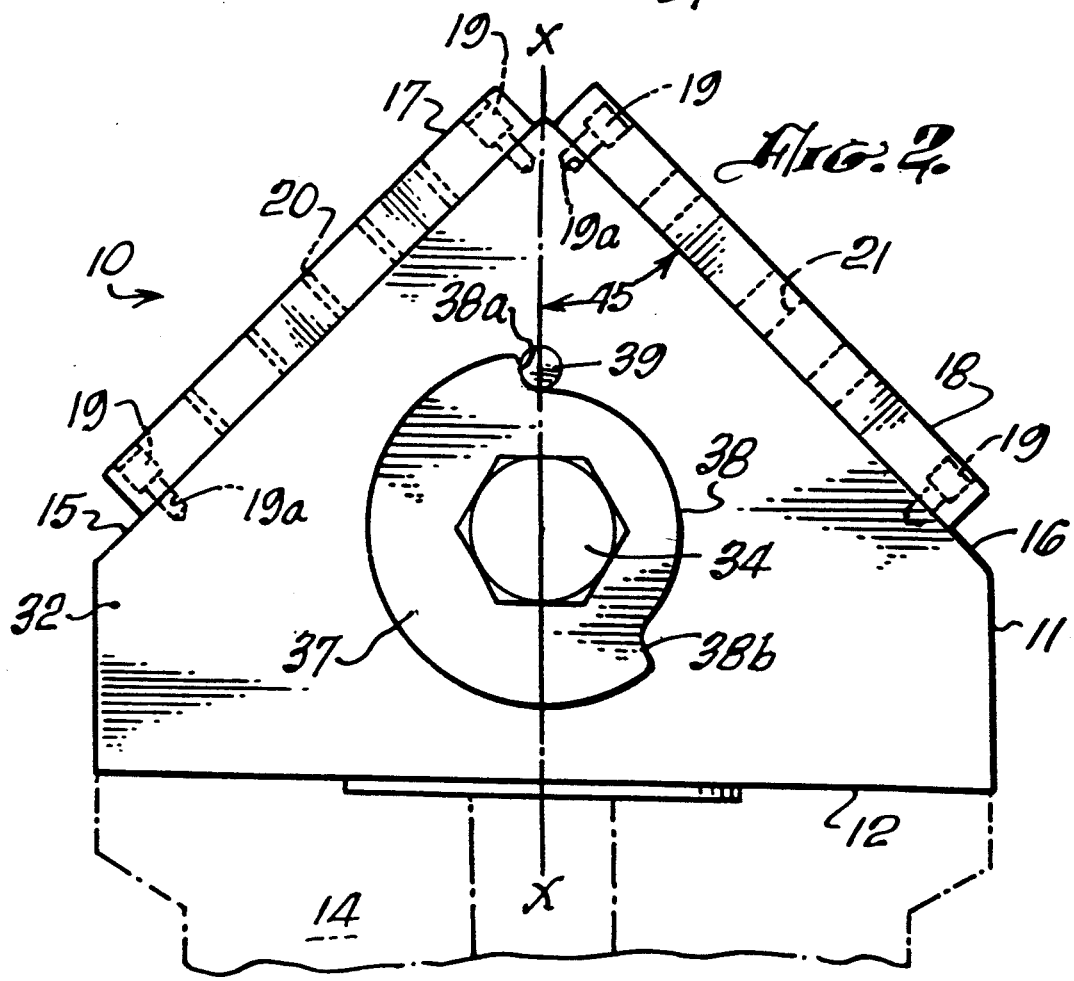
FIG. 2 is a top plan view of the extrusion die assembly of the present invention with the die plates attached thereto.

An embodiment of the present invention will hereinafter be described with reference to the figures in which the extrusion die assembly is generally indicated by reference numeral 10. The die assembly comprises a block 11 having a planar back face 12 which is adapted to be secured to the discharge end of an extruder 14 in axial alignment therewith, and a pair of spaced die faces 15 and 16 which are formed at an angle of about 45° to the axial centerline x—x of block 11. Die plates 17 and 18 are secured to die faces 15 and 16 respectively by suitable means such as circumferentially spaced bolts or cap screws 19 disposed in threaded openings 19a. Both die plates 17 and 18 have one or more shaped die orifices 20 and 21 extending through the plate. In accordance with one embodiment of the invention, die orifices 20 in die plate 17 have a cross-sectional shape and/or size which is different than the die orifices 21 in die plate 18 so that product extruded through die plate 17 will have a different shape and/or size than that extruded through plate 18. Alternatively die orifices 20 and 21 may, if desired, have the same cross-sectional shape and/or size.

The extrusion die assembly 10 may be secured to any conventional extruder 14, either of the single screw or twin screw type, used in the food industry, including Sprout Walden and Clextral extruders as well as those commercially available from Wenger Manufacturing Company of Sabetha, Kansas; Bonnot Company of Kent, Ohio; and Anderson Company of Cleveland, Ohio, with the die assembly 10 being secured to the extruder 14 by any suitable means (not shown) such as bolts, cap screws, clamping collars, and the like.

As shown in FIG. 3, die assembly block 11 has a single inlet duct 22 and two outlet ducts 24 and 25, the inner ends of which are in communication with the inner end of inlet duct 22 and the outer ends of which terminate in frustoconical chambers 26 and 27 at die faces 15 and 16 respectively. Inlet duct 22, which has a generally circular cross-section, extends into block 11 substantially perpendicular to the plane of back face 12 and is axially aligned with the discharge opening of extruder 14, as indicated by axis line x—x. Outlet ducts 24 and 25, of generally circular cross-section, branch from inlet duct 22 and diverge from the axis line x—x to carry thermoplastic material from the inlet duct to the spaced die plates 17 and 18, respectively. In the embodiment shown in FIG. 3, the outlet ducts diverge axially from the inlet duct at substantially the same angle as the spaced die faces 15 and 16 are formed with respect to the axial centerline of block 11, i.e. an angle of about 45°.

A cylindrical diversion valve 28 is rotatably mounted in block 11 at the convergence of outlet ducts 24 and 25 with inlet duct 22 for directing the flow of thermoplastic material from the inlet duct into one of the outlet ducts. Diversion valve 28, which is designed to be reciprocally rotated, comprises a cylindrical body 29 having an angled passage 30 extending substantially horizontally therethrough co-planar with the inlet duct 22 and the outlet ducts 24 and 25, and is mounted in a cylindrical hole 31 in block 11 which extends from the top
surface 32 thereof to a point below the convergence of the outlet ducts and the inlet duct. Sealing means, such as O-rings 33, are provided on the exterior of cylindrical body 29 above and below passage 30 to prevent leakage of thermoplastic material. Suitable means, such as hexagonal nut 34, is provided at the upper end of cylindrical body 29 to effect rotation of the body within block 11.

As shown in FIG. 5, passage 30 comprises two leg portions 35 and 36 which are offset from one another by an angle equivalent to that which the axial centerline of discharge ducts 24 and 25 diverge from the axial centerline of inlet duct 22. Thus in the embodiment illustrated in the figures in which the axial centerlines of the outlet ducts diverge from the axial centerline of the inlet duct by an angle of approximately 45°, legs 35 and 36 are likewise offset from one another by an angle of about 45°. In this manner, as valve 28 is reciprocally rotated in block 11, to one of two stop positions, one leg of passage 30 will be in communication with inlet duct 22 while the other leg of passage 30 will be in communication with one of the two discharge ducts, to direct thermoplastic material to the die plate associated with that discharge duct. A stop plate 37 integrally formed on the upper end of valve 28 limits the rotation of valve 28 in block 11. Stop plate 37, which is a generally circular disc, has a section 38 of reduced diameter extending over approximately 135° of the circumference of the plate, cooperates with pin 39 mounted in the top surface of block 11 to limit the rotation of valve 28 thereby enabling the valve to be rotated between one of two defined positions. This is, valve 28 is rotated until one end section, either 38a or 38b, engages pin 39. In this manner, rotation of valve 28 to one of two positions as determined by stop plate 37, will direct the flow of thermoplastic material to one of two die plates. Similarly, one of the die plates may be changed or a knife blade adjacent one of the die plates may be changed without disrupting the operation of the extruder by rotating valve 29 to divert the flow of material away from the die plate to be changed. By using die plates having orifices of different sizes and/or shapes, extruded product having different sizes/shapes may be produced merely by rotating the valve, without interrupting the operation of the extruder and with little loss of material.

The operation of the extrusion die apparatus is as follows:

In the position shown in the figures in which end portion 38a of the stop plate engages pin 39, passage 30 in diversion valve 28 is positioned so that leg 35 is in communication with inlet duct 22 and leg 36 is in communication with outlet duct 24. Thermoplastic material discharged from the extruder is carried through the inlet duct 22, passage 30, and outlet duct 24 to die plate 17 and is extruded through die orifices 20. When it is desired to change the size and/or shape of the extruded product, diversion valve 28 is rotated by means of hexagonal nut 34 until end portion 38b of the stop plate engages pin 39. In this position, leg 36 of passage 30 is in communication with inlet duct 22 while leg 35 is in communication with outlet duct 25, so that thermoplastic material is carried to and extruded through die plate 18. At this time, die plate 17 may, if desired, be changed.

The extrusion die assembly including diversion valve 28 may be constructed of any suitable material depending on the particular application for which it is to be employed. Generally, hardenable stainless steel is preferred.

As is apparent, the extrusion die assembly of this invention may be modified or altered from the embodiment shown and described herein. For example, the block 11 may be formed with a pair of spaced die faces which are parallel to the axial centerline of the block rather than at an angle of 45° thereto. In such embodiment the outlet ducts would diverge axially from the inlet duct at an angle of about 90°, and the legs of passage 30 through the cylindrical valve would be offset by an equivalent angle.

What is claimed is:

1. A multi-faced extrusion die assembly which comprises
   a block having a planar back face adapted to be secured to the discharge end of an extruder, a plurality of die faces remote from said back face on opposing sides of the axial centerline of the block, a die plate having at least one die orifice extending therethrough mounted on each die face,
   said block having an inlet duct in the planar back face to receive thermoplastic material discharged from the extruder, and a plurality of axially diverging outlet ducts in communication with said inlet duct and each of said die faces, and diversion valve means rotatably mounted in the block at the convergence of the inlet duct and the outlet ducts, said valve means having an angled passage extending therethrough for directing the flow of the thermoplastic material from the inlet duct into one of said outlet ducts.

2. The extrusion die assembly defined in claim 1 in which the plurality of die faces include a pair of spaced die faces on opposing sides of the axial centerline of the block, positioned at an angle to said axial centerline, and the plurality of axially diverging outlet ducts, with one end of each outlet duct being in communication with a die face and the opposing end being coplanar and in communication with the inlet duct.

3. The extrusion die assembly defined in claim 2 in which the angle at which the pair of spaced die faces are positioned relative to the axial centerline of said block and the angle at which the pair of axially diverging outlet ducts diverge from said centerline are the same.

4. The extrusion die assembly defined in claim 3 in which said angle is 45°.

5. The extrusion die assembly defined in claim 3 in which the diversion valve means comprises a cylindrical body with said angled passage having two leg portions which are offset from one another by an angle which is the same as the angle which the pair of outlet ducts diverge axially from said centerline.

6. The extrusion die assembly defined in claim 2 in which the die orifices in one of said die plates have a cross-sectional configuration or size different than the die orifices in the other die plate.

7. The extrusion die assembly defined in claim 5 in which the valve means includes means for limiting the rotation of the diversion valve to a preselected position in which one leg of said passage is in communication with the inlet duct while the other leg of said passage is in communication with a preselected outlet duct.

8. The extrusion die assembly defined in claim 2 in which the inlet duct and the pair of axially diverging outlet ducts in said block and the passage through said diversion valve are coplanar.

9. The extrusion die assembly defined in claim 2 in which the inlet duct extends into said block perpendicular to the planar back face thereof along the axial centerline of the block and is axially aligned with the discharge opening of the extruder to which the die assembly is secured.

* * * * *